(12) United States Patent
Gilbert et al.

(10) Patent No.: US 6,709,234 B2
(45) Date of Patent: Mar. 23, 2004

(54) IMPELLER SHAFT ASSEMBLY SYSTEM

(75) Inventors: Ronald E. Gilbert, Spokane, WA (US); Robert D. Dion, Spokane, WA (US); Mark A. Palmer, Spokane, WA (US); Kristopher M. Ratzlaff, Spokane, WA (US); Roger Kauffman, Spokane, WA (US); Charles Seale, Gulf Shores, AL (US)

(73) Assignee: Pyrotek, Inc., Spokane, WA (US)

( * ) Notice: Subject to any disclaimer, the term of this patent is extended or adjusted under 35 U.S.C. 154(b) by 0 days.

(21) Appl. No.: 09/944,660

(22) Filed: Aug. 31, 2001

(65) Prior Publication Data

US 2003/0044273 A1 Mar. 6, 2003

(51) Int. Cl.$^7$ .............................. F04D 7/06; F04D 29/20
(52) U.S. Cl. ................. 415/200; 415/216.1; 415/217.1; 416/244 R; 416/241 B; 417/423.3; 417/423.6; 417/424.1; 464/113; 464/159; 403/305; 403/306; 403/361; 403/383
(58) Field of Search ............................. 415/200, 216.1, 415/217.1; 416/204 R, 244 R, 241 B; 417/423.3, 423.6, 424.1; 464/157–159, 112, 113; 403/383, 361, 292, 305, 306

(56) References Cited

U.S. PATENT DOCUMENTS

| | | | |
|---|---|---|---|
| 2,634,991 A | * | 4/1953 | Stevens ....................... 403/383 |
| 4,954,167 A | | 9/1990 | Cooper |
| 5,078,572 A | | 1/1992 | Amra et al. |
| 5,092,821 A | | 3/1992 | Gilbert et al. |
| 5,165,858 A | | 11/1992 | Gilbert et al. |
| 5,181,828 A | | 1/1993 | Gilbert et al. |
| 5,294,245 A | | 3/1994 | Gilbert et al. |
| 5,470,201 A | | 11/1995 | Gilbert et al. |
| 5,622,481 A | * | 4/1997 | Thut ........................ 417/319 |
| 5,685,701 A | | 11/1997 | Chandler et al. |
| 5,993,728 A | | 11/1999 | Vild |

FOREIGN PATENT DOCUMENTS

JP          63-120897 A    *   5/1988   ................. 415/200

* cited by examiner

Primary Examiner—Christopher Verdier
(74) Attorney, Agent, or Firm—Wells St. John P.S.

(57) ABSTRACT

An impeller shaft assembly, coupler and molten metal pump are described, in which a coupling member is configured to be secured to a pump drive shaft and includes a socket part that is defined by a socket wall formed about and extending along an axis. The socket wall includes a plurality of coupling shaft engaging surfaces and a plurality of socket corner surfaces joining the shaft engaging surfaces. The socket corner surfaces are disposed radially outward from adjacent shaft engaging surfaces with respect to the axis.

30 Claims, 7 Drawing Sheets

IMPELLER SHAFT ASSEMBLY SYSTEM

TECHNICAL FIELD

The present invention relates to pumping molten metal and more particularly to an impeller shaft connection between a drive and an impeller in a molten metal pump.

BACKGROUND OF THE INVENTION

Pumping molten metal is a difficult task and a challenge to designers of pumping equipment. The high temperature of molten materials (such as aluminum) and the corrosive effect of the molten material and components used in the refining or smelting processes prohibit the use of ordinary pumping equipment.

The pump drive motor, for example, should be situated above the molten metal level to isolate the components of the motor and drive assembly from the molten metal. Thus, an impeller shaft assembly is typically provided between the drive shaft and the impeller to transmit rotational forces from the driver or motor to the impeller.

It has been found that a graphite refractory, "Silon"™, silicon carbide, and other heat resistant materials are suitable for impeller shafts due to the ability of these types of material compositions to withstand the heat and corrosive effects of molten metal.

Figure 1:
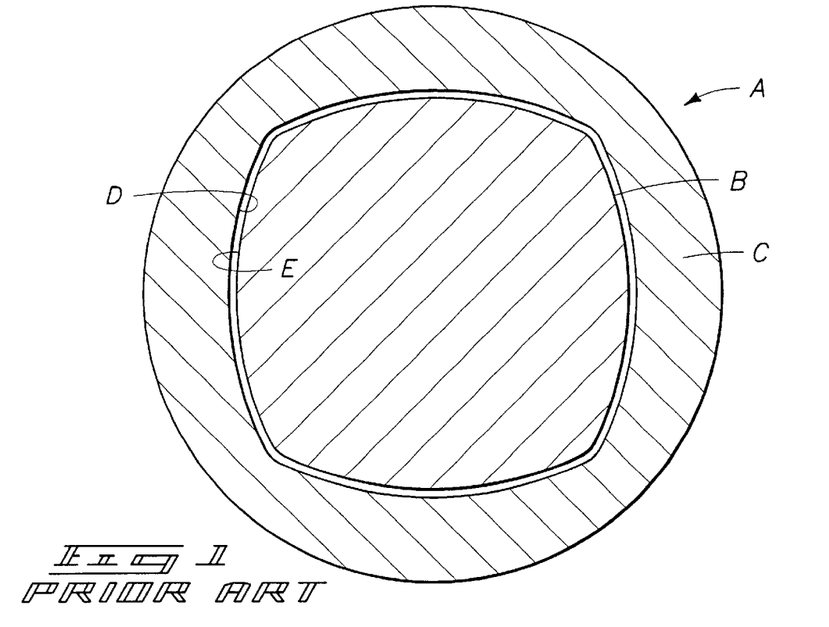
FIG. 1 is a sectioned diagrammatic view illustrating the interconnection between a socket member and impeller shaft of a prior art configuration.
Figure 2:
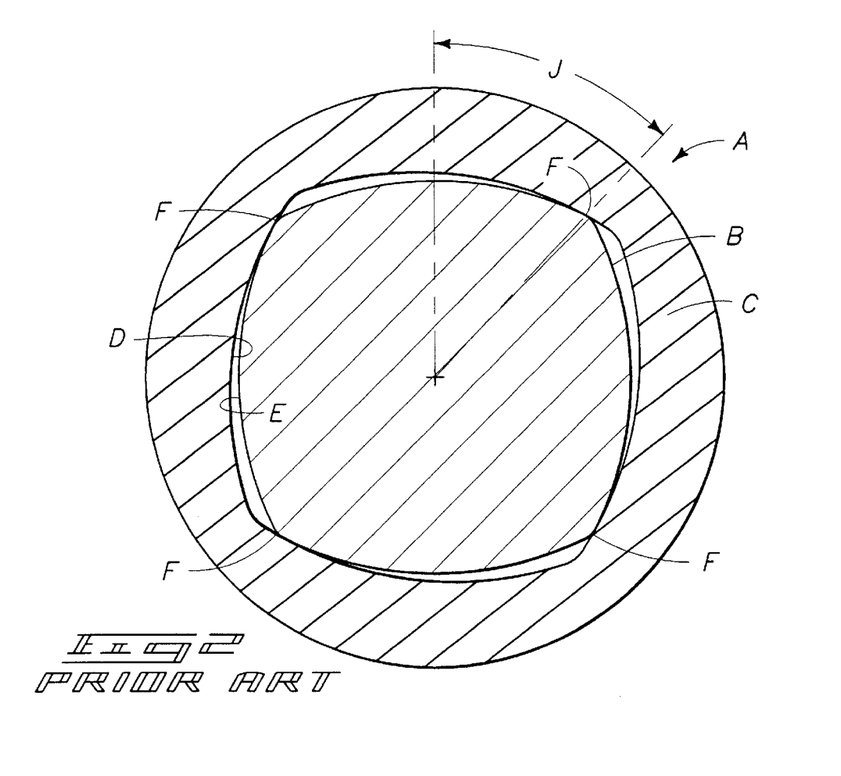
FIG. 2 is a view similar to FIG. 1 only showing relative rotation of the prior art socket member to a point where the impeller shaft is engaged.
Figure 3:
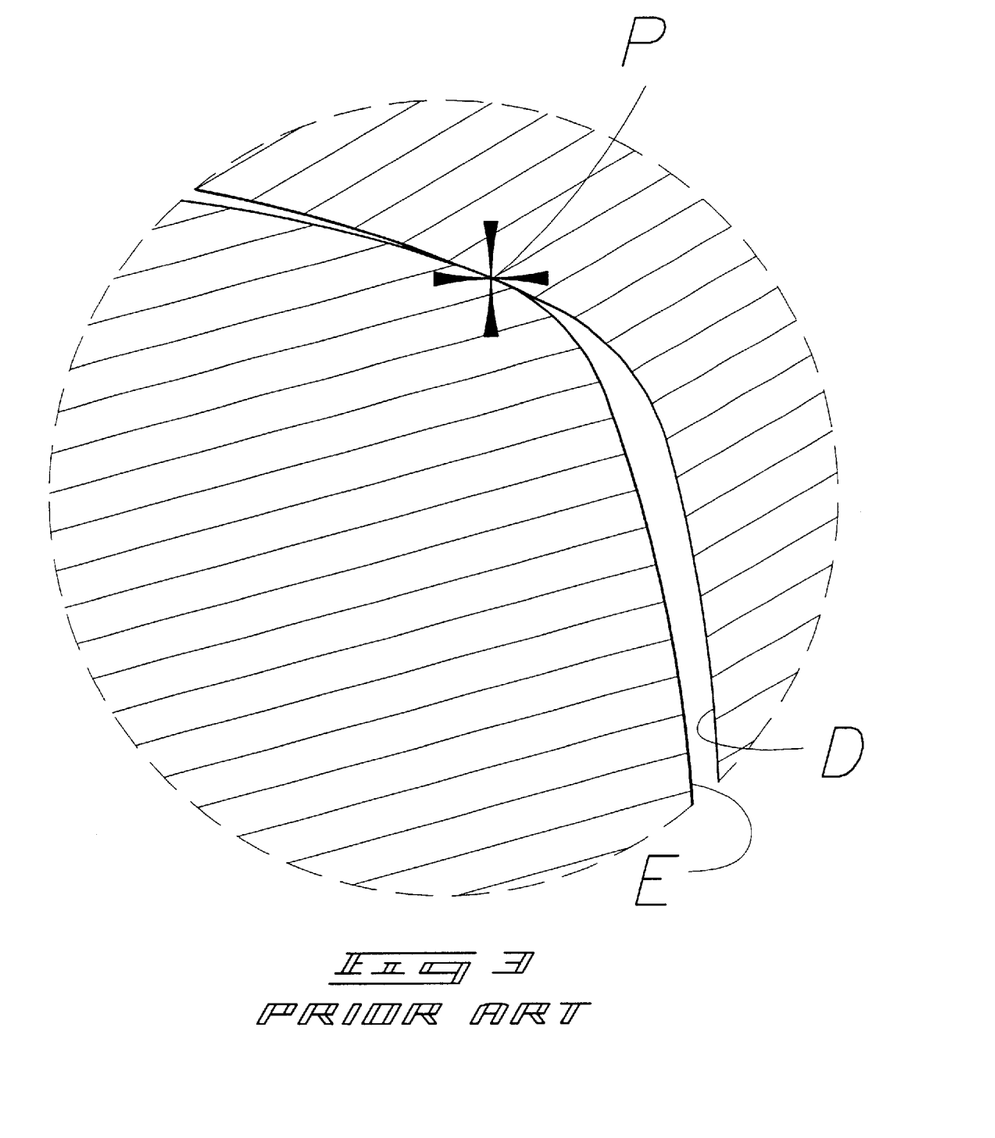
FIG. 3 is an enlarged detail view of the prior art arrangement indicating one of four contact points at corners of the impeller shaft end.

FIGS. 1–3 are illustrative cross-sectional views of a shaft assembly A in which a shaft end B is received within a connector socket C. The socket C is typically connected to the drive shaft of a drive motor. Some prior devices transmit torsional forces from the type of socket C shown in FIGS. 1–3 and a shaft end B by providing a "modified square" coupling arrangement. The socket C includes a formed socket part D and the shaft end B includes a complimentary configuration E. The two shapes are closely fitted together.

On the other hand, if the two members are loosely interfitted as shown in exaggerated form in FIGS. 1–3, transmission of torsion from the socket member to the shaft is concentrated closer to the corners of the "modified square" configuration of the shaft end. This places the corner portions in shear and can cause fracture and premature wear.

It has thus remained desirable to obtain a fitting arrangement whereby an impeller shaft can be removed for replacement from an impeller and drive assembly, but in which transmission of torque, especially at the coupling area between the drive shaft and impeller shaft is transmitted without excessive shear forces being concentrated at corner sections of the formed impeller shaft end.

BRIEF DESCRIPTION OF THE DRAWINGS

Preferred embodiments of the invention are described below with reference to the following accompanying drawings.

DETAILED DESCRIPTION OF THE PREFERRED EMBODIMENT(S)

Many of the connecting, fastening, manufacturing, and other means and components utilized in this invention are widely known and used in the field of the invention described, their exact nature or type is not necessary for an understanding and use of the invention by a person skilled in the art or science, and they will not therefore be discussed in significant detail. Furthermore, the various components shown are described herein for any specific application of this invention may be varied or altered as anticipated by this invention and the practice of a specific application of any element may already be widely known or used in the art, or by persons skilled in the art or science, and each will not therefore be discussed in significant detail.

Terms "a", "an" and "the" as used in the claims herein are used in conformance with longstanding claim drafting practice and interpretation and not in a limiting way. Unless specifically set forth herein, the aforementioned terms are not limited to one of such items, but instead, are intended to mean "at least one".

The term "coupler" as used herein includes generally a structural component for interconnecting a drive shaft and an impeller shaft in a molten metal pump assembly. The coupler may be an integral part of the drive shaft or be a separable component as generally illustrated and described herein.

The term "connector shaft", as used herein, should be understood to be that portion of the structural connection between the coupler and the impeller. The shaft is preferably formed to facilitate removal and replacement between the coupler and impeller.

Span of the impeller shaft means any configuration whether arcuate, curved and/or straight, or any combination thereof.

Center section means the inner approximate sixty percent of the span. Thus contact does not occur in the outer twenty percent of the span.

The terms "up", "down", "top", "bottom" are relative terms and are used simply for ease of description. It is to be understood that the elements and apparatus described herein may be used in other orientations than those shown and the generic directional or spatial descriptions used herein are simply to assist in identification of elements in the relationship of the objects illustrated in the drawings. Furthermore, the terms "in", "out", and like terms are used with respect to a common central axis "X" for the drive shaft axis and "Y" for the impeller shaft assembly axis, both axes being at least approximately coaxial when the shaft is mounted in position with the coupling. Thus, an element said to be positioned "inward" generally should be understood as being positioned in closer proximity to the axis or axes X, Y; or to a specified other feature or element. Likewise, the terms "concave" and "convex" should be understood to mean respectively bending toward and bending away from the central axis.

Before proceeding further with detailed description of preferred elements and forms of the invention, a summary of various general aspects of the invention will be provided, with reference to the drawings. Reference numerals listed herein refer to like exemplary elements shown in the various views.

A first aspect of the invention includes an impeller shaft assembly 10 for a molten metal pump 12 having an impeller 14 and driver 16 with a drive shaft 18 rotatable about a drive axis X. The impeller shaft assembly includes a coupling member 20 configured to be secured to the pump drive shaft 18, and a connector shaft 30 including a first end 31, mountable to the coupling member 20 in substantial coaxial alignment with the drive axis X, and a second end 32 configured for connection to the pump impeller 14. The coupling member 20 includes a socket part 21 defined by a socket wall 22 comprised of shaft engaging surfaces 23 that are formed about, extend axially along, and are centered on a coupling axis Y. The first end 31 of the connector shaft 30 includes a shaped configuration 33 releasably receivable within and shaped differently from and non-complimentary to the socket part 21 of the coupling member 20. The shaped configuration 33 includes peripheral side surfaces 34, each of which is radially adjacent to a shaft engaging surface 23 and extends to corner segments 35 that are spaced to opposed sides of the adjacent shaft engaging surface 23. The shaft 30 is rotatable in response to rotation of the coupling member 20 and engagement of the peripheral side surfaces 34 by the shaft engaging surfaces 23 within engagement zones Z that are disposed between successive corner segments 35.

In another aspect, an impeller shaft assembly 10 is provided for a molten metal pump 12 having an impeller 14 and driver 16 with a drive shaft 18 rotatable about a drive axis X. In this aspect, the impeller shaft assembly 10 includes a coupling member 20 configured to be secured to the pump drive shaft 18, and a connector shaft 30 with a first end 31 mountable to the coupling member 20 in substantial coaxial alignment with the drive axis X, and a second end 32 configured for connection to the pump impeller 14. The coupling member 20 includes a socket part 21 defined by a socket wall 22 comprised of shaft engaging surfaces 23 that are formed about a coupling axis Y and that are movable with the coupling member 20 in a rotational path P about the drive axis X. The coupling member 20 further includes socket corner parts 24 that adjoin successive shaft engaging surfaces 23. The first end 31 of the connector shaft includes a peripheral side surface 34 for each of the shaft engaging surfaces 23. Each peripheral side surface 34 includes an engagement zone Z disposed in the rotational path P (FIGS. 4, 6) of an associated shaft engaging surface 23 of the coupling member 20. The first end 31 of the connector shaft 30 also includes corner segments 35 that are spaced radially outward of the engagement zones Z.

In a further aspect of the invention includes an impeller shaft assembly 10 for a molten metal pump 12 having an impeller 14 and driver 16 with a drive shaft 18 rotatable about a drive axis X. The impeller shaft assembly in this aspect includes a coupling member 20 configured to be secured to the pump drive shaft 18 and a connector shaft 30 with a first end 31 that is mountable to the coupling member 20 in substantial coaxial alignment with the drive axis X, and a second end 32 configured for connection to the pump impeller 14. The first end 31 of the connector shaft includes a geometric cross-sectional configuration 33 with substantially flat peripheral side surfaces 34. The coupling member 20 also includes curvilinear shaft engaging surfaces 23 that are disposed in relation to the substantially flat peripheral side surfaces 34 of the shaft 30 such that rotation of the coupling member about the drive axis will result in engagement of the curvilinear shaft engaging surfaces 23 with the peripheral side surfaces 34.

A still further aspect of the invention includes a coupler 19 for the drive shaft 18 of a molten metal pump 12, in which a coupling member 20 is provided and configured to be secured to the pump drive shaft 18. The coupler includes a socket part 21 defined by a socket wall 22 formed about and extending along an axis X. The socket wall 22 includes a plurality of coupling shaft engaging surfaces 23 and a plurality of socket corner surfaces 24 joining the shaft engaging surfaces 23. The socket corner surfaces 24 are disposed radially outward from adjacent shaft engaging surfaces 23, with respect to the axis X.

A further aspect of the invention includes a molten metal pump connector shaft 30 for releasably connecting a drive shaft 18 and pump impeller 14. An elongated shaft body 36 extends along an axis Y between a first end 31 and a second end 32, the second end 32 being configured to be mounted to the impeller 14. The shaft end 31 is configured to be received by a coupling member 20 on the drive shaft 18 and includes a cross sectional shape 33 comprised of peripheral side walls 34 joined by corner wall parts 35. Coupling member contact zones Z are located along the peripheral side walls, angularly disposed in relation to the corner wall parts about the axis Y by acute angles.

Another aspect of the invention includes a molten metal pump 12 and a driver 16 with a drive shaft 18 powered to rotate about a drive shaft axis X. A support plate 46 is also included, mounting the driver 16, and at least one post 48 extending axially along the drive shaft axis from the support plate 46. An impeller housing 50 is mounted to the at least one post 48 and is axially spaced from the support plate 46. An impeller 14 is situated within the impeller housing 50. A coupling member 20 is provided on the drive shaft 18, including a socket part 21. Shaft engaging surfaces 23 are formed about the drive shaft axis and are movable in a rotational path P. A connector shaft 30 has a first end 31 that is received within the socket part 21, in driving contact with the shaft engaging surfaces 23 of the coupling member 20. The connector shaft extends to a second end 32 that is mounted to the impeller 14 to transmit rotational forces thereto. The first end 31 of the connector shaft 30 includes a peripheral side surface 34 for each shaft engaging surface 23, and corner segments 35 between the shaft engaging surfaces 23 that are disposed radially outward of the rotational path P. Shaft engaging zones Z are spaced along the peripheral side surfaces between successive corner segments 35 and in intersecting relation to the rotational path P of the shaft engaging surfaces 23.

A still further aspect includes an impeller shaft assembly 10 for a molten metal pump 12 having an impeller 14 and driver 16 with a drive shaft 18 rotatable about a drive axis X. The impeller shaft assembly 10 includes a coupling member 20 that is configured to be secured to the pump drive shaft 18 for rotation about an axis Y that is substantially coaxial with the drive axis X. The coupling member 20 includes a socket part 21 with shaft engaging surfaces 23 formed about the axes X,Y. A connector shaft 30 includes a first end 31 that is mountable to the coupling member 20 in substantial coaxial alignment with the drive shaft axis X, and a second end 32 that is configured for connection to the pump impeller 14. The first end 31 includes peripheral side surfaces 34 and corner surfaces 35. Junction points 37 join the peripheral side surfaces 34 and corner surfaces 35. The peripheral side surfaces 34 include mid points M between the junction points 37. The shaft engaging surfaces 23 of the coupling member 20 are positioned to engage the peripheral side surfaces 34 along contact zones Z which are spaced angularly from the junction points 37 toward the mid-points M, in response to rotation of the coupling member about the axes X, Y.

Another aspect includes molten metal pump shaft coupler 19 for operatively attaching a pump drive shaft 18 to a connector shaft 30. The coupler 19 includes a drive shaft aperture 17 on a first side of the coupler. The drive shaft aperture 17 is configured to receive and operatively attach to the drive shaft 18. A socket 21 is provided on a second side of the coupler 19, being generally configured to receive the connector shaft 30. The socket 21 includes at least two convex contact surfaces or inner lobes 23, within a center span portion 29 of the inner wall sections. The at least two convex inner lobes 23 are configured to contact the connector shaft 30 at a center section 61 of the connector shaft 30.

In a further aspect a replacement connector shaft 30 is provided for operative attachment to a molten metal pump shaft coupling 19 by insertion into a socket 21 in the coupling. The connector shaft 30 includes a first end 31 with an outer surface 33 which includes at least two center sections 61 and end sections 62 that bound each center section 61. The outer surface 33 of the first end 31 of the shaft 30 is configured to be inserted into the socket 21 in the coupling 19 such that at least one of the center sections 61 contacts an internal wall 22 of the socket 21. The replacement impeller shaft 30 also includes a second end 31 that is configured to be operatively attached to a molten metal pump impeller 14.

Figures 13, 14:
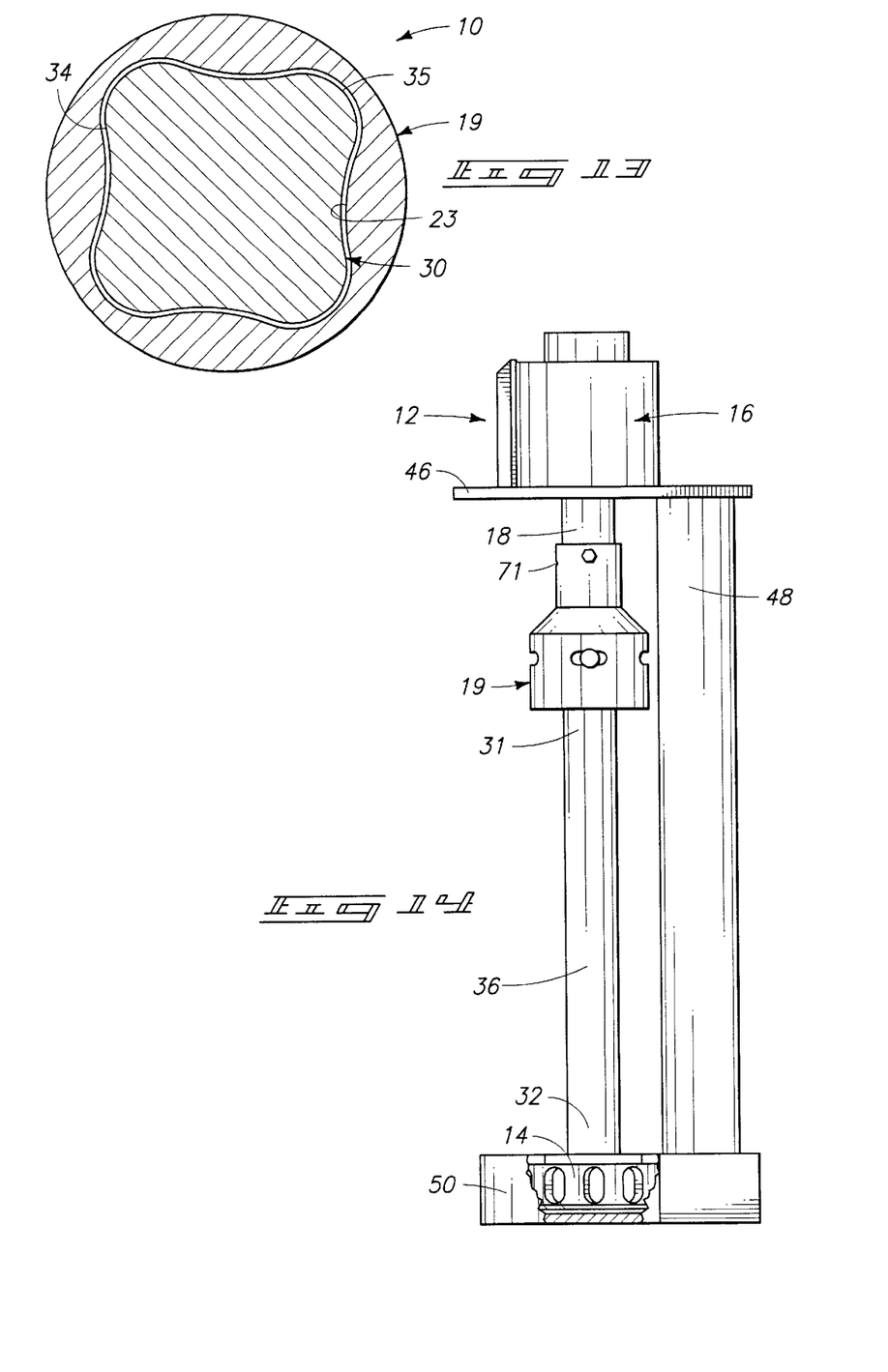
FIG. 14 is a side elevation view of an exemplary molten metal pump.

As pointed out earlier, various structural components of the pump 12 are of a conventional form and will not be discussed in detail herein, as such components are well known to those of ordinary skill in the art of molten metal pump design. It is sufficient to say that the pump driver 16 (FIG. 14) is in the form of a electric, pneumatic, or hydraulic motor that is supported on a plate 46 at a spaced position from the impeller housing 50 by one or more elongated posts 48. The impeller shaft assembly 10 extends between the drive shaft 18 and the impeller 14 which may also be of a conventional form.

Figure 4:
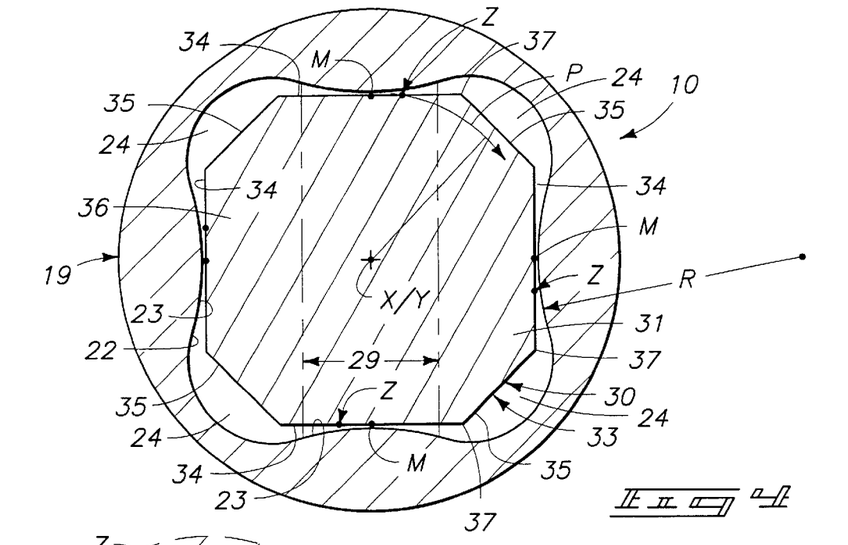
FIG. 4 is a sectional view of a first preferred form of an impeller shaft assembly system in sectional view.
Figures 5, 6:
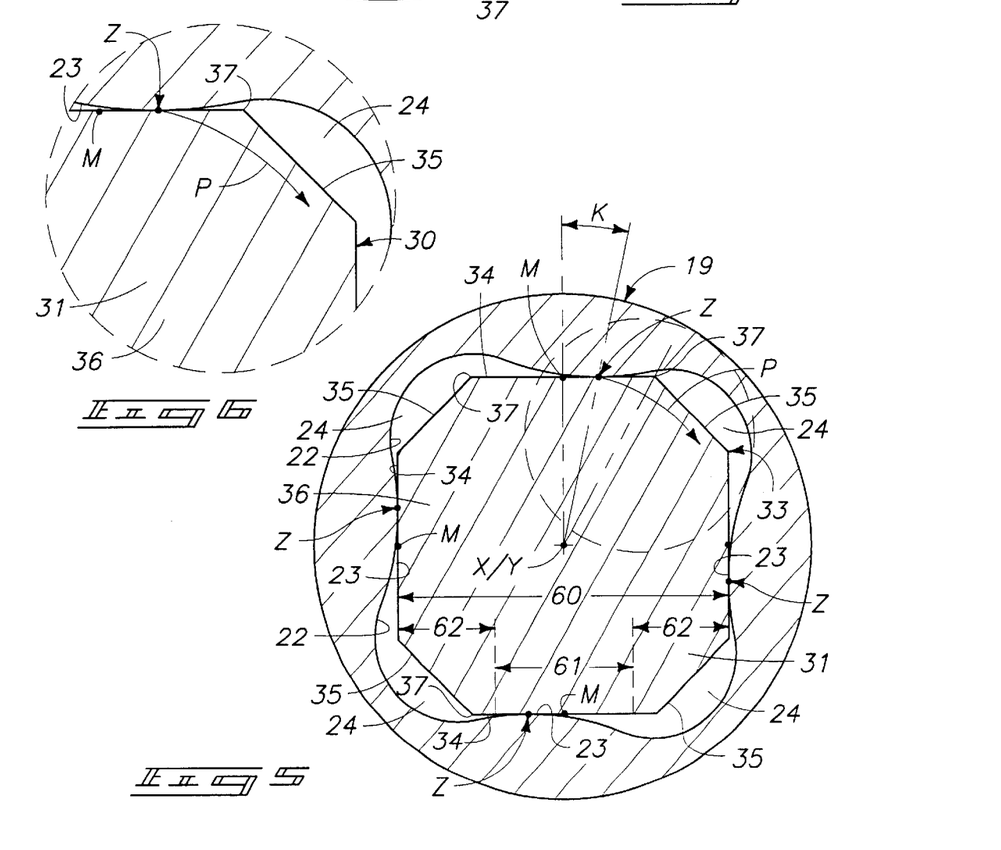
FIG. 5 is a view similar to FIG. 4, only showing relative rotation of the coupler and connector shaft.
FIG. 6 is an enlarged fragmented view of the area identified by the numeral 6 in FIG. 5 and indicating the contact zone.
Figure 7:
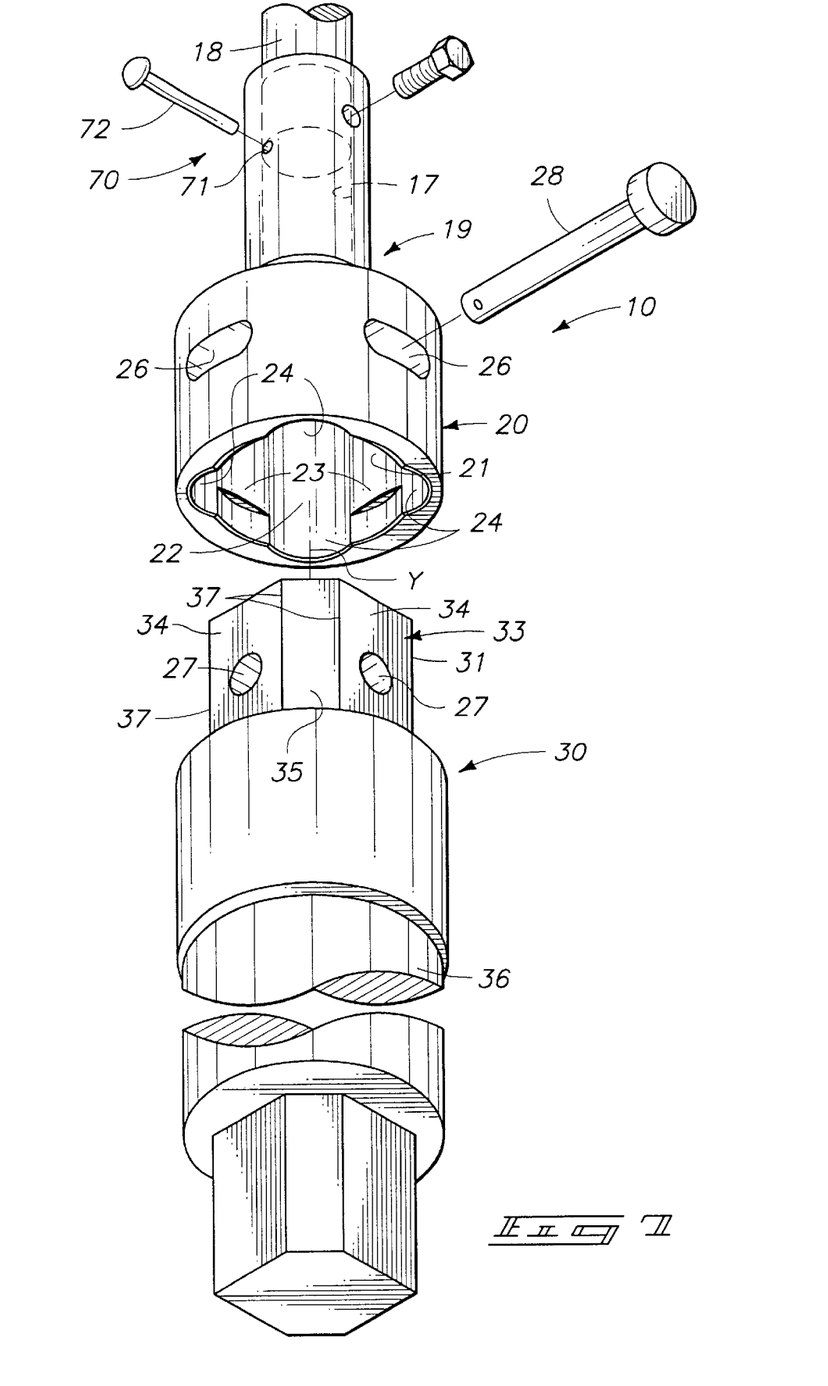
FIG. 7 is an exploded perspective view of a coupler and connector shaft.
Figure 8:
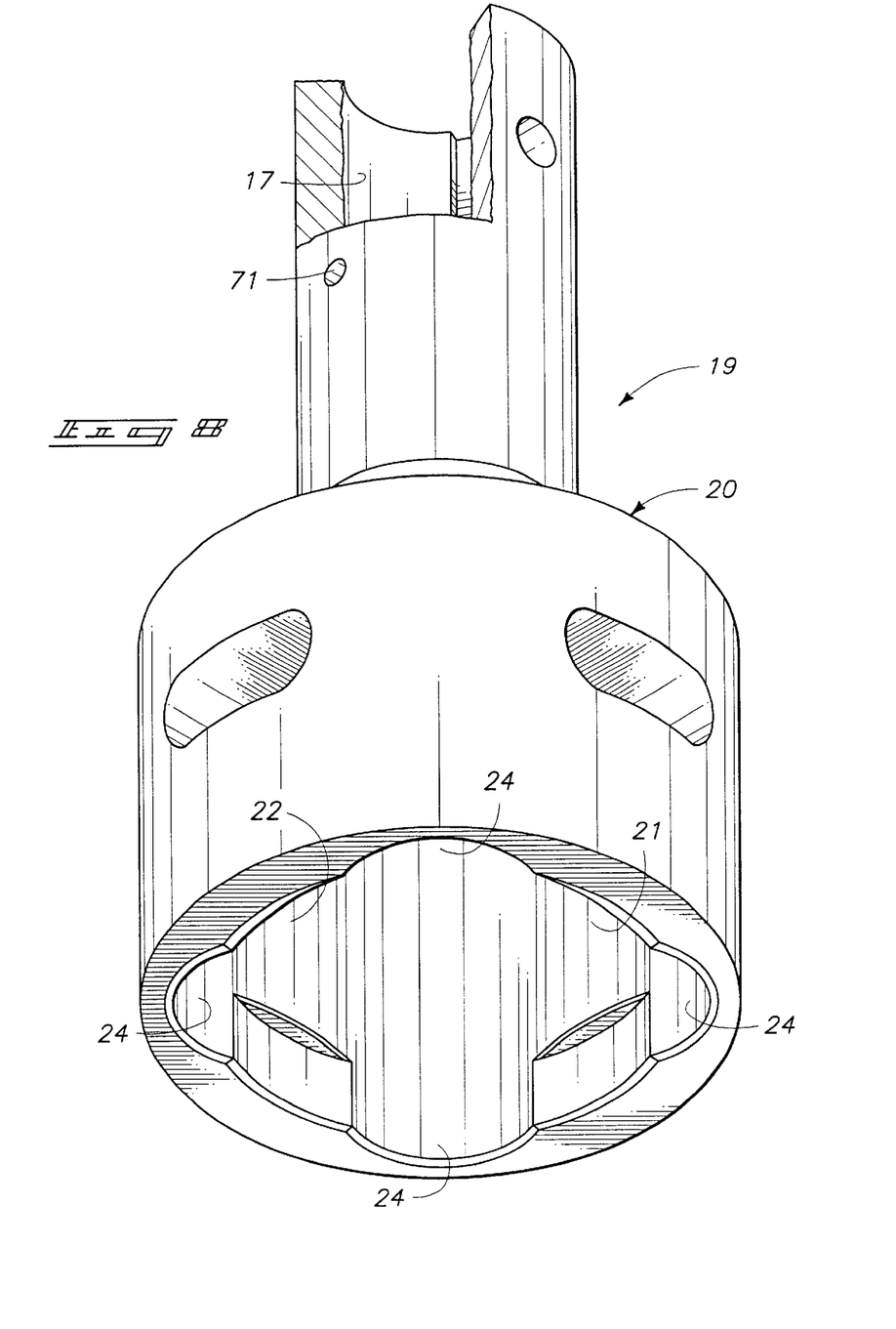
FIG. 8 is an enlarged perspective view of a coupler.

Looking in greater detail at the coupler 19, reference is made to FIG. 7 and, particularly, FIG. 8, with reference also being had to FIGS. 4–6. The exemplified coupler 19 is indicated as being fitted to the drive shaft 18. This may be accomplished by a keyed opening, a splined connection, set screws, adhesive, welding, or other fastening arrangements by which the coupler becomes substantially unitary with the drive shaft for rotation coaxially about the rotational axis X for the drive shaft, thus making the central axis Y of the coupler coaxial with the shaft axis X.

Accurate axial positioning of the coupler 19 on the drive shaft 18 is permitted by an axial positioner 70 exemplified in FIG. 7. The positioner 70 may be comprised of a through hole 71 formed in the coupler adjacent top end thereof. The hole 71 is spaced below the top end of the coupler 19 by a prescribed distance. Thus, a pin 72 when filled through the hole, will stop the coupler 19 at a precise axial position on drive shaft 18 when the coupler is being mounted to the shaft. The result is a precise positioning of the coupler and resultant precise axial positioning of the connector shaft and elements mounted at the bottom end thereof.

It is preferable that the coupler 19 be substantially coaxial with the draft shaft 18 to avoid vibration and undesired application of torsional forces to the connector shaft and impeller during the operation. It is also preferable that the coupler formed using conventional forming technology, of a conventional material such as steel.

As set forth earlier, the coupler 19 is comprised of a coupling member 20 that includes a socket part 21 at a lower end thereof, configured to receive the first end 31 of connector shaft 30. The configuration of the socket part 21, as may be noted in FIGS. 4 and 5, in preferred forms, may be different than the cross-sectional configuration of the first shaft end 31. This is substantially true of other exemplary forms of the assembly 10, several of which are illustrated in FIGS. 9–13. Other configurations may be utilized as well.

The exemplary socket wall 22 as shown in FIG. 4 is a rounded, undulating configuration moving from convex shaft-engaging surfaces 23 that are rounded and project toward the central axis Y, to socket corner parts 24 that are joined tangentially to the shaft-engaging surfaces 23 and that are of concave, extending radially outward of the surfaces 23. The concave corner parts 24 provide ample clearance or space between the socket corner parts 24 and adjacent connector shaft corner segments 35 so contact is not made at corners of the shaft end 31.

By providing such spacing, it is not possible for rotational or torsional forces to be transmitted directly from the coupling member 20 to the corner segments 35 of the connector shaft 30. Such forces are transmitted to the shaft, however, the contact points is situated at angular locations (contact zones Z) along the peripheral side surfaces 34 where the applied torsional forces are applied more toward the center section of the shaft.

The coupling member 20 also includes a centering part 25 that is situated axially upward from the bottom end of the socket part. The centering part 25 may be formed as inclined surfaces that will engage and substantially center the connector shaft first end 31 as it is axially inserted within the socket part 21, thereby initiating and assisting maintenance of a substantially coaxial relationship between the coupler and connector shaft.

Preferred forms of the coupling member 20 may include angularly spaced lock pin receiving slots 26 (FIG. 8). The slots are preferably elongated about the central axis Y through an angle related to the amount of relative rotation allowed between the coupler 19 and connector shaft 30. The slots 26 will become aligned, as the shaft end is inserted within the socket, with apertures 27 formed in the first end 31 of the connector shaft. Appropriate pins 28 (FIG. 7) may be used to secure the coupling member 20 and impeller shaft in axial locked position as determined by the axial positioner 70, while allowing a degree of relative movement between the two elements by reason of the angular slots 26.

The connector shaft 30 is preferably of sufficient length to extend between the coupler 19 and the impeller 14. Depending upon the nature of the pump, the shaft 30 may be of various lengths and outward configurations. The shaft body 36, partially shown in FIG. 7, is indicated as being substantially circular. However, it should be understood that other cross-sectional configurations could be used. Furthermore, while graphite may be the preferred material for construction of the shaft, it is possible that other materials could also be used.

The connector shaft 30, as earlier described, extends between a first end 31 and a second end 32. The first end, as alluded to above, is configured for reception within the socket part 21 of the coupler. The second end of the shaft 30 is configured to be connected in driving relation to the impeller 14. Various configurations may be used for interconnecting the shaft and impeller, including threaded couplings, mechanical fasteners, socket fittings, and others.

The opposite, first end 31 of the connector shaft 30 is preferably slidably and releasably received within the socket part 21 of the coupler 19. The first shaft end 31 is preferably formed in a cross-sectional configuration that is different (not complimentary) to the cross-sectional configuration of this socket. This different relationship is clearly shown in FIGS. 4–6, and by the alternate examples illustrated in FIGS. 9–13.

The peripheral walls 34 formed along the first end 31 are intended to be engaged by the shaft-engaging surfaces 23 of the coupling member. These surfaces 34 are preferably of length dimensions that are greater than length dimensions of the associated corner segments 35. This relationship is also shown in various ways as may be understood by viewing FIGS. 4–6 and 9–12.

Figures 9, 10, 11, 12:
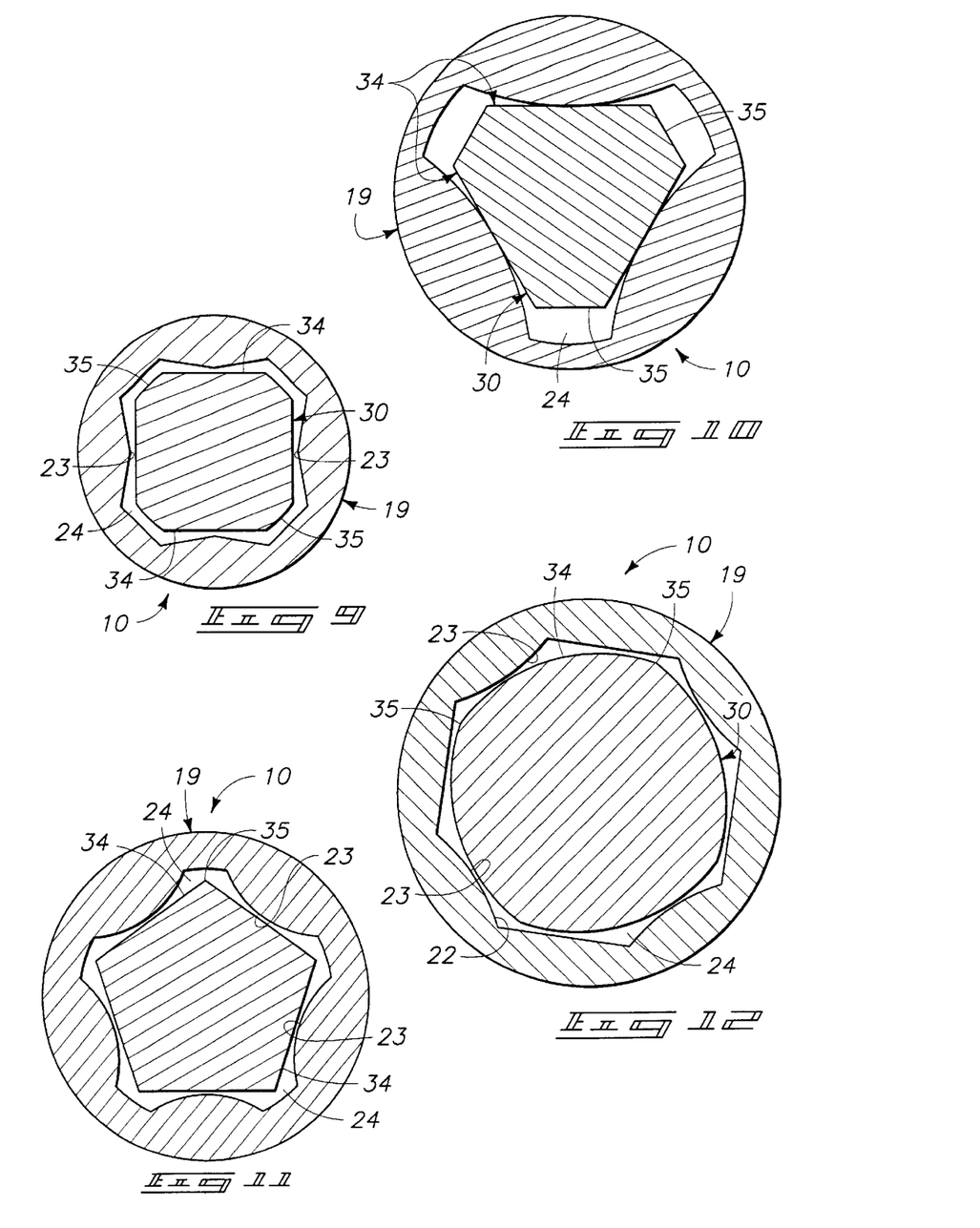
FIGS. 9–13 are exemplary alternate configurations of shaft engaging surfaces and shaft peripheral surfaces.

While the general configuration of the peripheral surfaces 34 and corner segments 35 is shown as being of a substantially geometric configuration, it may be understood that other configurations may be utilized as well. Thus, the term "geometric" should not be understood as including only straight or angular surfaces. It could well be that the first shaft end 34 be formed with rounded peripheral surfaces, one example of which is generally illustrated in FIG. 12. Similarly, a combination of rounded and straight, planer surfaces is exemplified in FIG. 9, where the corner segments 35 are rounded and the peripheral surfaces 34 are straight could be used.

It is preferable that the first end 31 be formed with cross-sectional dimensions that are sufficiently less than the opening size of the socket part 21 to facilitate a degree of free axial motion of the shaft during mounting and dismounting procedures. Thus, the shaft may slide into position with centering assistance provided by the angled surfaces of the centering part 25. However such loose tolerances will also allow a degree of relative rotation between the coupler 19 and connector shaft 30. The socket and shaft end configurations discussed herein allow for such relative rotation without allowing for torsion to be applied at the far corners of the connector shaft. Instead, such torsional forces are applied further inwardly, toward the substantially coaxial central axes X, Y with respect to the corner junctions 37. More of the shaft mass is thus exposed to resist shear stress, than is available at the corner parts. Less wear and breakage of the shaft end may therefor be expected.

In operation, the drive will rotate the drive shaft 18 in a direction of rotation in order to operate the pump to move molten materials. As the drive shaft rotates, torsional forces are transmitted to the coupler 19. The coupler will rotate slightly as allowed by the angular slots and pin connections, and until a contact zones Z are engaged along the peripheral surfaces 34 of the connector shaft 30.

The rotational path P of the coupling member 20 is such that the engagement zones Z are reached by the shaft-engaging surfaces 23 at points angularly disposed from the corner segments 35 (and radially inward thereof). In this form illustrated in FIG. 5, the zone Z is situated angularly from an adjacent corner segment 35 by an acute angle. In fact, the engagement zones Z are spaced more toward the longitudinal center points or mid-points M of the peripheral surfaces 34. Contact within the zones Z assures that the engaged surfaces on the connector offer much more resistance to shear forces than would be available at the corner parts 35. Thus, a strong, yet readily releasable fit is accomplished between the socket member and shaft.

FIG. 5 further shows engagement angle K which is an angle defined by a line through midpoints M and the X/Y center point as a base, and a line to the point of engagement (in the contact zone Z) where the force is applied by the coupling member on the shaft. A goal of aspects or embodiments of this invention is to reduce or minimize the magnitude of angle K to move the point at which the coupling member applies force to the impeller shaft toward the center or mid-points M.

FIG. 5 further generally illustrates an approximate width 60 of the impeller shaft and a center section 61 of impeller shaft 30. The center section 61 illustrates a preferred area in which the force is applied from the coupling member or coupler, to the impeller shaft. The center section 61 is preferably the approximately inner sixty percent of the shaft, with approximately twenty percent being on each side of the center section.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An impeller shaft assembly for a molten metal pump having an impeller and driver with a drive shaft rotatable about a drive axis, the impeller shaft assembly comprising:
   a coupling member configured to be secured to the pump drive shaft;
   a connector shaft including a first end, mountable to the coupling member in substantial coaxial alignment with the drive axis, and a second end configured for connection to the pump impeller;
   wherein the coupling member includes a socket part defined by a socket wall comprised of shaft engaging surfaces formed about and extending axially along and centered on a coupling axis; and
   wherein the first end of the connector shaft includes a shaped configuration releasably receivable within and shaped differently from the socket part of the coupling member;
   wherein the shaped configuration includes peripheral side surfaces, each of which is radially adjacent to a shaft engaging surface and extends to corner segments spaced to opposed sides of the adjacent shaft engaging surface; and
   wherein the shaft is rotatable in response to rotation of the coupling member and engagement of the peripheral side surfaces by the shaft engaging surfaces within engagement zones that are disposed between successive corner segments.

2. The impeller shaft assembly of claim 1 wherein the peripheral side surfaces are flat.

3. The impeller shaft assembly of claim 1 wherein the peripheral side surfaces are flat and the corner segments are comprised of angular surfaces joining the peripheral side surfaces, forming the first end into a polygonal shape.

4. The impeller shaft assembly of claim 1 wherein the shaft engaging surfaces of the coupling member lead to corner socket surfaces that are formed into the coupling member and that are spaced radially outward of the corner segments of the connector shaft.

5. The impeller shaft assembly of claim 1 wherein the first end of the connector shaft is of a polygonal cross-section and the socket part is formed by interconnected curved surfaces.

6. The impeller shaft assembly of claim 1, wherein the first end of the connector shaft is of a polygonal cross-sectional shape and the socket part is formed to axially receive the polygonal cross-sectional shape and includes interconnected curved surfaces including corner socket walls formed in the coupling member and that are spaced radially outward of the corner segments.

7. An impeller shaft assembly for a molten metal pump having an impeller and driver with a drive shaft rotatable about a drive axis, the impeller shaft assembly comprising:

a coupling member configured to be secured to the pump drive shaft; a connector shaft including a first end, mountable to the coupling member in substantial coaxial alignment with the drive axis, and a second end configured for connection to the pump impeller;

wherein the coupling member includes a socket part defined by a socket wall comprised of shaft engaging surfaces that are formed about a coupling axis and that are movable with the coupling member in a rotational path about the drive axis;

wherein the coupling member further includes socket corner parts adjoining successive shaft engaging surfaces;

wherein the first end of the connector shaft includes a peripheral side surface for each shaft engaging surface;

wherein each peripheral side surface includes an engagement zone disposed in the rotational path of an associated shaft engaging surface of the coupling member; and wherein the first end of the connector shaft also includes corner segments that are spaced radially outward of the engagement zones and on opposed sides of the shaft engaging surfaces.

8. The impeller shaft assembly of claim 7 wherein the shaft engaging surfaces are arcuate and are substantially centered between the socket corner parts.

9. The impeller shaft assembly of claim 7 wherein the socket corner parts are spaced radially outward of the shaft engaging surfaces and the rotational path of the shaft engaging surfaces.

10. An impeller shaft assembly for a molten metal pump having an impeller and driver with a drive shaft rotatable about a drive axis, the impeller shaft assembly comprising:

a coupling member configured to be secured to the pump drive shaft;

a connector shaft including a first end that is mountable to the coupling member in substantial coaxial alignment with the drive axis, and a second end configured for connection to the pump impeller;

wherein the first end of the connector shaft includes a geometric configuration with substantially flat peripheral side surfaces; and wherein the coupling member includes curvilinear shaft engaging surfaces that are disposed in relation to the substantially flat peripheral side surfaces of the shaft such that rotation of the coupling member about the drive axis will result in engagement of the curvilinear shaft engaging surfaces with the peripheral side surfaces.

11. An impeller shaft assembly as defined by claim 10 wherein the geometric configuration is an approximate octagon, with four peripheral side surfaces and four corner surfaces joining the side surfaces.

12. An impeller shaft assembly as defined by claim 10 wherein the geometric configuration is an approximate octagon, with four peripheral side surfaces and four corner surfaces joining the side surfaces and wherein the peripheral side surfaces include length dimensions greater than the corner surfaces.

13. An impeller shaft assembly as defined by claim 10 wherein the geometric configuration is an approximate octagon, with four peripheral side surfaces and four corner surfaces joining the side surfaces and wherein the coupling member includes socket corner parts joining the shaft engaging surfaces and which loosely receive the corner surfaces.

14. The impeller shaft assembly of claim 10 wherein the curvilinear shaft engaging surfaces curve toward the drive axis; and further comprising socket corner parts formed as concave surfaces joined to the shaft engaging surfaces.

15. A coupler for a drive shaft of a molten metal pump, comprising:

a coupling member configured to be secured to the pump drive shaft and including a socket part defined by a socket wall formed about and extending along an axis;

wherein the socket wall includes a plurality of coupling shaft engaging surfaces and a plurality of socket corner surfaces joining the shaft engaging surfaces; and wherein the socket corner surfaces are disposed radially outward from adjacent shaft engaging surfaces with respect to the axis.

16. The coupler of claim 15 wherein the socket corner surfaces are curved.

17. The coupler of claim 15 wherein the socket corner surfaces are concave with respect to the axis and the shaft engaging surfaces are convex with respect to the axis.

18. The coupler of claim 15 wherein the coupling shaft engaging surfaces are formed on radii with centers situated radially outward of the coupling member.

19. A molten metal pump connector shaft for releasably connecting a drive shaft and pump impeller, comprising:

an elongated shaft body extending between a first end and a second end;

the second end being configured to be mounted to the impeller;

the first end being configured to be mounted to the drive shaft and including a cross sectional shape, comprised of peripheral side walls joined by corner wall parts; and wherein the peripheral side walls are of substantially equal lengths and the corner wall parts are of lengths that are less than the peripheral side wall lengths; and wherein the first end is of a geometrical configuration in which the peripheral side walls and corner wall parts are substantially straight and joined alternately with each corner wall being disposed between adjacent peripheral side walls.

20. A molten metal pump connector shaft for releasably connecting a drive shaft and pump impeller, comprising:

an elongated shaft body extending between a first end and a second end, the shaft body being at least partially formed of graphite;

the second end being configured to be mounted to the impeller;

the first end being configured to be mounted to the drive shaft and including a cross sectional shape, comprised of peripheral side walls joined by corner wall parts;

wherein the peripheral side walls are of substantially equal lengths and the corner wall parts are of lengths that are less than the peripheral side wall lengths;

wherein the first end is of a geometrical configuration in which the peripheral side walls and corner wall parts are substantially straight and joined alternately with each corner wall being disposed between adjacent peripheral side walls; and wherein at least one of the peripheral side walls includes a lock pin aperture.

21. A molten metal pump, comprising:

a driver with a drive shaft powered to rotate about a drive shaft axis;

a support plate mounting the driver;

at least one post extending axially along the drive shaft axis from the support plate;

an impeller housing mounted to the at least one post and axially spaced from the support plate;

an impeller within the impeller housing;

a coupling member on the drive shaft, including a socket part comprised of shaft engaging surfaces formed about the drive shaft axis and movable in a rotational path;

a connector shaft having a first end received within the socket part and in driving contact with the shaft engaging surfaces of the coupling member;

wherein the connector shaft extends to a second end mounted to the impeller to transmit rotational forces thereto;

wherein the first end of the connector shaft includes a peripheral side surface for each shaft engaging surface, and corner segments between the shaft engaging surfaces that are disposed radially outward of the rotational path; and wherein shaft engaging zones are spaced along the peripheral side surfaces between successive corner segments and in intersecting relation to the rotational path of the shaft engaging surfaces.

22. An impeller shaft assembly for a molten metal pump having an impeller and driver with a drive shaft rotatable about a drive axis, the impeller shaft assembly comprising:

a coupling member configured to be secured to the pump drive shaft for rotation about an axis substantially coaxial with the drive axis and including a socket part with shaft engaging surfaces formed about the axes;

a connector shaft including a first end that is mountable to the coupling member in substantial coaxial alignment with the drive shaft axis, and a second end configured for connection to the pump impeller;

wherein the first end includes peripheral side surfaces and corner surfaces joined at junction points with the peripheral side surfaces;

wherein the peripheral side surfaces include mid points between the junction points; and wherein the shaft engaging surfaces of the coupling member are positioned to engage the peripheral side surfaces along contact zones which are spaced angularly from the junction points toward the mid-points, in response to rotation of the coupling member about the axes.

23. The impeller shaft assembly of claim 22 wherein acute angles are formed between the contact zones and the junction points.

24. The impeller shaft assembly of claim 22 wherein the peripheral side surfaces and corner surfaces form a polygon about the axes.

25. The impeller shaft assembly of claim 22 wherein the shaft engaging surfaces include convex curvatures, bending toward the axes.

26. The impeller shaft assembly of claim 22 further comprising socket corner parts formed in the coupling member, adjoining the shaft engaging surfaces and extending in radial directions outwardly therefrom.

27. The impeller shaft assembly of claim 22 wherein the shaft engaging surfaces include convex curvatures, bending toward the axes, and wherein the coupling member further includes socket corner parts that are formed therein, adjoining the shaft engaging surfaces and extending outwardly therefrom in radial directions.

28. A molten metal pump shaft coupler for operatively attaching a pump drive shaft to a connector shaft, the coupler comprising:

a drive shaft aperture on a first side of the coupler, the drive shaft aperture configured to receive and operatively attach to the drive shaft;

a socket on a second side of the coupling, generally configured to receive the connector shaft and comprising:

at least two convex inner lobes in a center span portion of inner wall sections, the at least two convex inner lobes being configured to contact the impeller shaft at a center section of the impeller shaft.

29. The molten metal pump shaft coupler of claim 28 further comprising an axial positioner on the first side of the coupler positioned to limit axial motion of the coupler on the pump drive shaft.

30. The molten metal pump shaft coupler of claim 28 further comprising an axial positioner including a hole formed through the coupler along the first side, and a pin received in the hole and axially positioned to abut with an end of the pump drive shaft to assist axial positioning of the coupler on the pump drive shaft.

* * * * *